United States Patent
Agarwala et al.

(10) Patent No.: US 8,270,764 B1
(45) Date of Patent: Sep. 18, 2012

(54) REPLACING PIXELS WITHIN A BOUNDARY AREA OF A BASE IMAGE TO GENERATE A COMPOSITE IMAGE

(75) Inventors: Aseem Agarwala, Seattle, WA (US); Erik Randall Johnson, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1052 days.

(21) Appl. No.: 11/903,468

(22) Filed: Sep. 21, 2007

(51) Int. Cl.
*G06K 9/36* (2006.01)

(52) U.S. Cl. ........ 382/284; 382/100; 382/173; 382/254; 382/276; 345/629; 345/634

(58) Field of Classification Search .................. None
See application file for complete search history.

(56) References Cited

U.S. PATENT DOCUMENTS

| | | | | |
|---|---|---|---|---|
| 5,469,536 A | * | 11/1995 | Blank | 345/594 |
| 5,687,306 A | * | 11/1997 | Blank | 345/634 |
| 6,075,905 A | * | 6/2000 | Herman et al. | 382/284 |
| 2006/0104542 A1 | * | 5/2006 | Blake et al. | 382/284 |
| 2007/0237421 A1 | * | 10/2007 | Luo et al. | 382/284 |
| 2008/0120560 A1 | * | 5/2008 | Cohen et al. | 715/764 |

OTHER PUBLICATIONS

Richardson, "Using Microsoft Paint", Jul. 19, 2001.*
Agarwala et al., Authoring effective depictions of reality by combining multiple samples of the plenoptic function, Jan. 2006, Doctoral thesis, University of Washington.*
Perez et al., "Poisson image editing", 2003, ACM Transactions on Graphics, 313-318.*
Agarwala et al., Interactive Digital Photomontage, to appear in the ACM SIGGRAPH '04 conference proceedings.
Aseem Agarwala, Authoring Effective Depictions of Reality by Combining Multiple Samples of the Plenoptic Function, 2006.

* cited by examiner

*Primary Examiner* — Matthew Bella
*Assistant Examiner* — Jason Heidemann
(74) *Attorney, Agent, or Firm* — Van Pelt, Yi & James LLP (57) ABSTRACT

An indication of a base image is received. An indication of an acceptable portion of a source image is received. A boundary area in the base image is determined based at least in part on the acceptable portion of the source image. A composite image is generated at least in part by replacing one or more pixels in the base image. Pixel replacements are constrained to within the boundary area. The composite image is displayed.

22 Claims, 9 Drawing Sheets

REPLACING PIXELS WITHIN A BOUNDARY AREA OF A BASE IMAGE TO GENERATE A COMPOSITE IMAGE

BACKGROUND OF THE INVENTION

In digital photography, it is possible to combine different parts of each of a set of images into a single composite image. This process is sometimes referred to as "photomontage." For example, when a photographer desires a photo of a group of people, he may take multiple photos to increase the chances of obtaining a photo in which each person looks acceptable. For example, a photographer may desire that all of the people in the photo are looking forward, have open eyes (i.e., are not blinking), and are smiling. If there are no resulting photographs in which each person looks acceptable, then the photographer may use a compositing feature to combine acceptable parts of different images into a single composite image. To do this, the photographer typically must identify a set of source images, identify the portion of each source image he wants in the composite image, and then apply the compositing feature. This can be a time consuming task. In addition, the methods used in typical compositing systems can sometimes yield unexpected results. As such, improved techniques for generating composite images would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
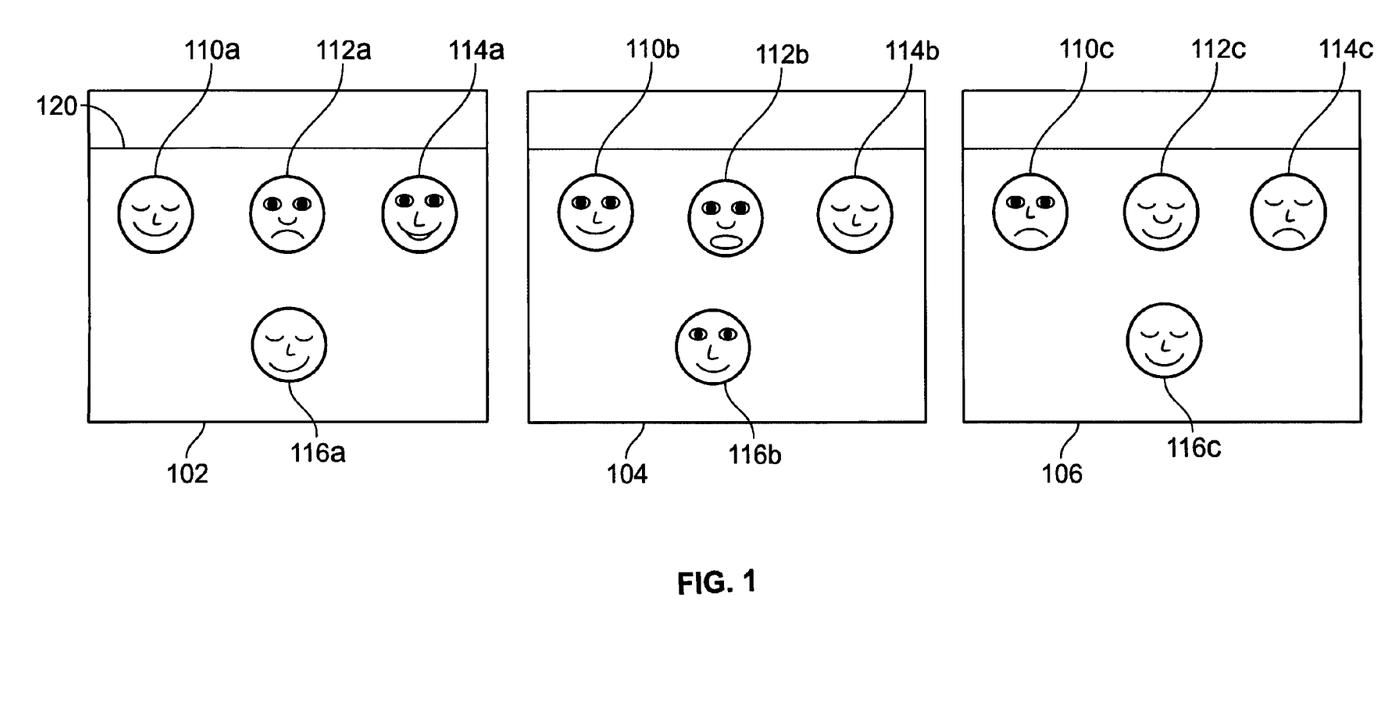
FIG. 1 is a diagram illustrating an example of three images.

FIG. 1 is a diagram illustrating an example of three images 102, 104, and 106. An image may include a digital photograph (photo), artwork, design, video frame or video, or any other type of visual data. In this example, images 102-106 depict a group shot of four people 110, 112, 114, and 116. The background of the image includes a ceiling 120. A group shot is an image depicting two or more subjects, such as people. Often, a photographer taking a group shot will take multiple photos in succession (e.g., within a few seconds to a few minutes of each other) in order to ensure that at least one photo will look acceptable (e.g., everyone is looking forward, no one is blinking, etc.) An acceptable or desirable image is one in which there are no unacceptable or undesirable features or parts, such as a person blinking or frowning, a head turned to the side, etc. What is acceptable or desirable may vary and could depend on the user, where the user could include one or more of: the subject(s) of the photo, recipient (s) of the photo, an editor, a customer, etc.

In this example, the three images 102-106 have been taken of the same group of people within a few seconds of each other. Faces 110a, 110b, and 110c in images 102, 104, and 106, respectively, correspond to the same person 110. Faces 112a, 112b, and 112c in images 102, 104, and 106, respectively, correspond to the same person 112. Faces 114a, 114b, and 114c in images 102, 104, and 106, respectively correspond to the same person 114. None of the images is acceptable to the user in this example. For example, in image 102, faces 110a and 116a are blinking and face 112a is frowning. In image 104, face 112b's mouth is open and face 114b is blinking. In image 106, face 110c is frowning, face 112c is blinking, face 114c is blinking and frowning, and face 116c is blinking. Given that none of the images on its own is acceptable to the user, the user may decide to use a compositing feature to combine the desirable portions of each image into a single composite image in which each person in the composite image is acceptable to the user.

In some applications, in order to composite multiple images into a composite image, the user studies each of the images, and marks the portion of each image that the user wants to keep. For example, the user may want to combine face 110b, the eyes and nose of face 112b, the mouth of face 112c, face 114a, and face 116b into a single composite image. In each of the source images, the user marks those parts of the image. If the user does not mark those parts, the composite image will not necessarily include those parts. As such, the user has to "protect" the parts of the image that the user likes or risk losing these parts in the composite image.

As used herein, a source image includes any image that is used to generate a composite image. In this case, because the user marked a portion of each of images 102-106, each of images 102-106 is a source image. The source images are combined in some way to produce a composite image.

In some embodiments, the user selects a base image and incorporates portions from source images to create a composite image. For example, the base image may be an image which has the fewest undesirable parts in it. In the case of FIG. 1, image 104 may be selected as the base image, because it has only two undesirable features (face 112b has an open mouth and face 114b is blinking), whereas images 102 and 106 have three or more undesirable features. However images 102 and 106 do have features that are desirable in the composite image (notably, portions of these images may be used to replace the undesirable portions of image 104). As such, the user may decide to make images 102 and 104 source images. In this case, the user indicates (e.g., marks) the portions of the source images which the user desires to replace the base image with, as more fully described below. In this case, images 102 and 106 are source images while image 104 is a base image. Using this technique, the user does not need to "protect" or mark the portions of the base image the user wants to keep. The pixels in the base image are assumed to be the desired pixels unless at least one corresponding portion of a source image is marked (or otherwise indicated).

Figure 2:
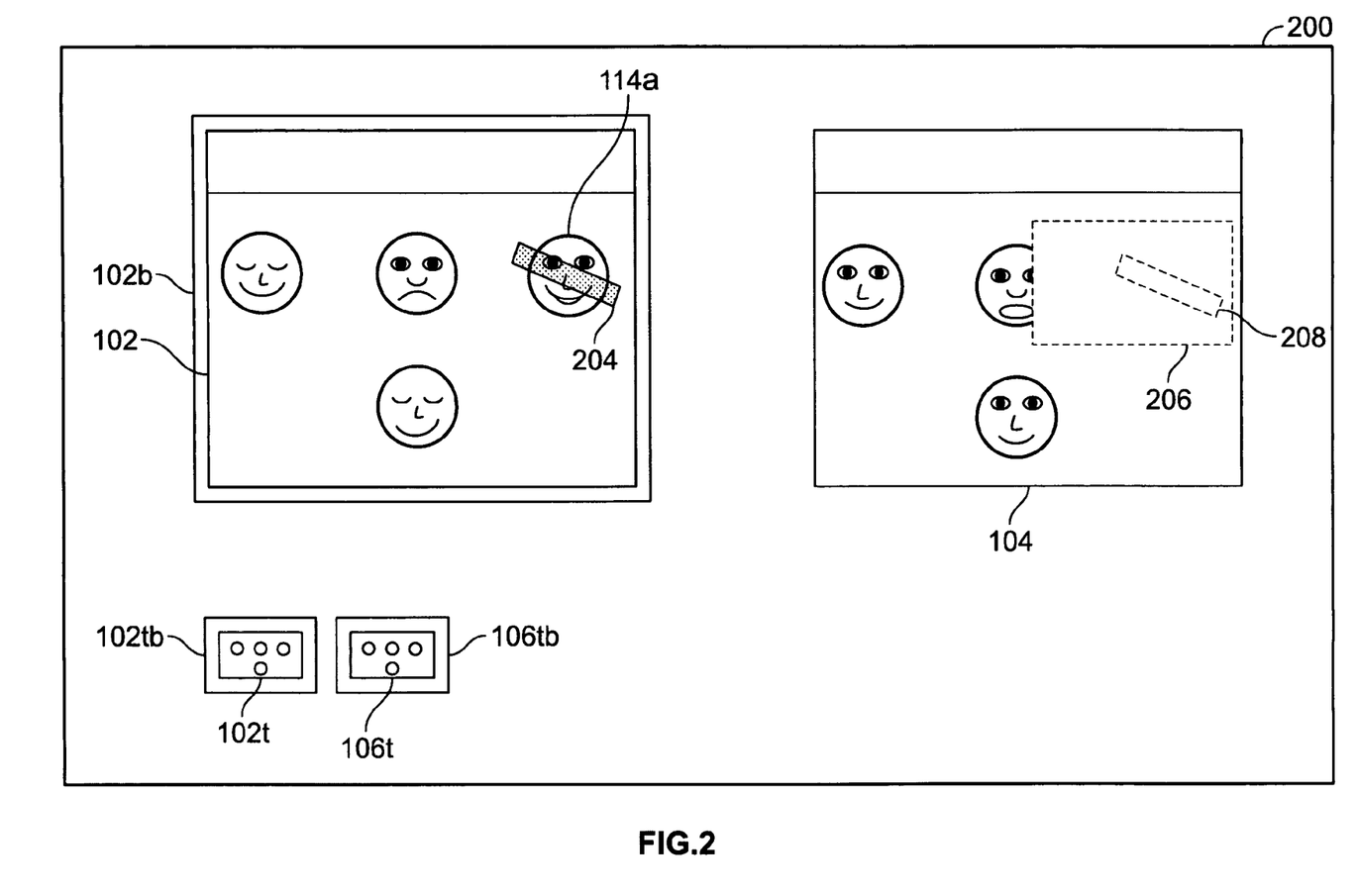
FIG. 2 is an example of a user interface (UI) for indicating a base image and a source image to use to generate a composite image.

FIG. 2 is an example of a user interface (UI) for indicating a base image and a source image to use to generate a composite image. In this example, UI 200 is shown to include on the left hand side an area to view and mark source images. Currently, source image 102 is being viewed. A user has marked image 102 by drawing a stroke 204 across face 114a. This indicates that the user desires that a portion of source image 102 corresponding to stroke 204 be used to replace a portion of the base image. In various embodiments, stroke 204 may be drawn by a user using a pen, paintbrush, or other drawing tool. The drawing tool can have varying thickness in various embodiments. Besides drawing a stroke on a source image, in other implementations, the user can indicate a portion of the source image in other ways. For example, the user may circle a portion of the source image or a portion of the source image may be selectable.

Below the source image being viewed and/or marked (i.e., source image 102) are thumbnails of images that may be used as source images, in this case, thumbnails 102t and 106t of image 102 and 106, respectively. Image 102 has a border 102b and thumbnails 102t and 106t each have borders 102tb and 106tb, respectively. In this example, color is a visual cue used to indicate a correspondence between a source image, a stroke on the source image, and a thumbnail of the source image. For example, stroke 204, border 102b, and border 102tb have the same color in some embodiments to indicate that they correspond to each other. UI 200 is shown to include on the right hand side a selected base image, in this case, image 104. Because stroke 204 was drawn over face 114a of source image 102, a corresponding portion of base image 104 may be modified, as indicated by boundary area 206. In some embodiments, boundary area 206 is based on stroke area 208, where stroke area 208 is a portion of image 104 that corresponds to stroke 204 in source image 102. In some embodiments, stroke area 208 includes the same (x, y) pixels as the pixels in stroke 204. In some embodiments, stroke area 208 includes some but not all of the same (x, y) pixels as the pixels in stroke 204. For example, source image 102 and base image 104 are not necessarily aligned with each other. For example, after taking image 102, the photographer might not have been holding the camera in the exact same spot when he took image 104. Therefore, what is depicted in image 102 may be translated or rotated with respect to what is depicted in image 104.

Boundary area 206 may be defined in various ways in various embodiments. Boundary area 206 can be any area surrounding and/or including stroke area 208. In some embodiments, boundary area 206 is determined by taking stroke area 208, drawing the minimum sized rectangle that fits around stroke area 208, and scaling up the size of the rectangle by some factor.

Any pixels outside of boundary area 206 are not modified in some embodiments; that is, a constraint is imposed that limits any pixel modifications to within boundary area 206. This allows for a more targeted pixel replacement. In some cases, restricting changes to be roughly local to (in the vicinity of) the stroke is what the user expects. Note that the boundary area constraint is only with respect to a particular stroke corresponding to the boundary area. A subsequently added stroke may have a different boundary area and pixel modifications based on that stroke are not limited to the boundary area computed for this stroke.

Figure 3:
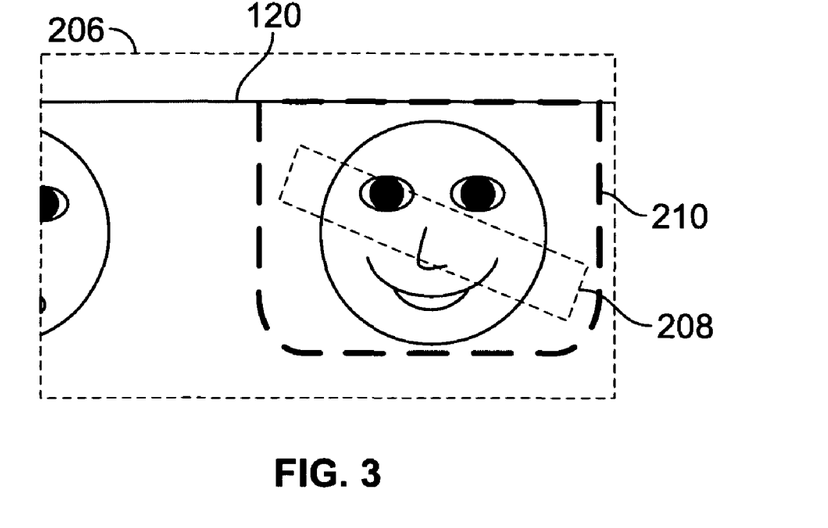
FIG. 3 illustrates an example of a boundary area of an image.

FIG. 3 illustrates an example of a boundary area of an image. In this example, boundary area 206 is shown. Boundary area 206 includes stroke area 208, and modified area 210. In some embodiments, the pixels in stroke area 208 (i.e., stroke pixels 208) are replaced with the pixels under corresponding stroke 204 from source image 102. In some embodiments, the pixels in boundary area 206 other than the pixels in stroke area 208 may take one of two values: (1) replaced with corresponding pixels from source image 102 or (2) remain the same (i.e., taken from base image 104). In some embodiments, which of the above two values each pixel takes is determined using cost function minimization. For example, a cost function is computed using values of the pixels in the source image and values of the pixels in the base image. The cost function is minimized given one or more constraints. In some embodiments, there are two constraints: (1) the pixels in stroke area 208 are from stroke 204; and (2) only pixels in boundary area 206 may be modified (i.e., pixels in image 104 outside boundary area 206 are not modified with respect to stroke 204.) In some embodiments, the cost function is such that minimizing the cost function results in transitions or seams (between source image pixels and base image pixels) that are unnoticeable to the eye. For example, minimizing the cost function may result in a transition along an edge, such as between a ceiling and a wall, or along a background. Some examples of cost function minimization are described in "Interactive Digital Photomontage" (A. Agarwala et al., "Interactive Digital Photomontage," ACM Trans. Graphics, August 2004, pp. 292-300.)

As an example, in FIG. 3, cost function minimization given the above two constraints is applied. As a result, it is determined that the pixels in a modified area 210 are replaced with corresponding pixels from source image 102. Pixels other than those in modified area 210 or stroke area 208 are unmodified or taken from base image 104. As shown, the cost function used in this example resulted in modified area 210 being a continuous area. In addition, modified area has a top border along ceiling 120 because a transition along an edge such as a ceiling is less visible to the eye.

Other variations are possible. For example, the pixels in boundary area 206 outside of stroke area 208 may be replaced with a blended value, such as a blend between a corresponding pixel from source image 102 and the base image pixel. Some examples of blending techniques are described in "Interactive Digital Photomontage" (A. Agarwala et al., "Interactive Digital Photomontage," ACM Trans. Graphics, August 2004, pp. 292-300.) Another variation is that a cost function is minimized using just the first constraint, in which case pixel modification is not limited to pixels in boundary area 206. In some cases, however, this may be undesirable, because it may yield unexpected results to the user. Because modifications are not constrained to take place in the portion of the image corresponding to a stroke, marking a face on one side of an image may cause the other side of the image to change, which may be surprising to the user. As such, adding the second constraint of limiting pixel modification to pixels within boundary area 206 may be desirable for improved usability. In addition, processing may be faster when imposing this second constraint, which also may be desirable to the user.

In some embodiments, modified area 210 (which includes stroke area 208) is shaded or outlined using the color corresponding to source image 102 as a visual cue or indicator to the user that that portion of the image is taken from source image 102. In some cases, the entire image outside of modified area 210 is shaded or outlined in a color corresponding to base image 104 to indicate that those pixels are taken from base image 104. This is the case when this stroke is the first one made with respect to this base image. A subsequently added stroke may cause pixel modifications in other portions of the image, and the modified area corresponding to those changes may be shaded or outlined in another color corresponding to the source image used to make those changes.

Figure 4:
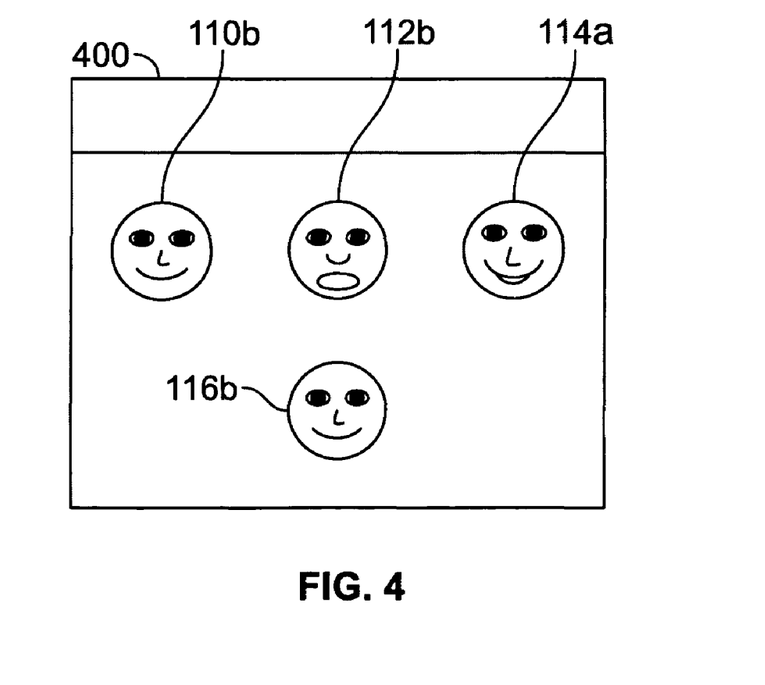
FIG. 4 is an example of a composite image.

FIG. 4 is an example of a composite image. In this example, composite image 400 is what base image 104 looks like after it is composited with source image 102 based on stroke 204. As shown, (the pixels corresponding to) face 114b has been replaced with (the pixels corresponding to) face 114a.

In some embodiments, in response to the user drawing stroke 204 in UI 200, composite image 400 is generated and base image 104 is updated to show composite image 400. A user can then add another stroke to image 102 or 104 and in response, a new composite image is generated and displayed to show the effect of the added stroke. For example, in FIG. 4, the user is now satisfied with image 400 except that face 112b still has his mouth open. The user may next decide to find a source image in which face 112b is smiling and mark face 112b in that image to indicate replacement pixels for face 112b in base image 104. Looking back at FIG. 1, it appears that of source image 102 and (potential) source image 106, face 112b is not acceptable in either of them. In source image 102, face 112a is frowning. In image 106, face 112c is blinking. However, it is possible to take the smile of face 112c and use it to replace the open mouth of face 112b, as more fully described below.

Figure 5:
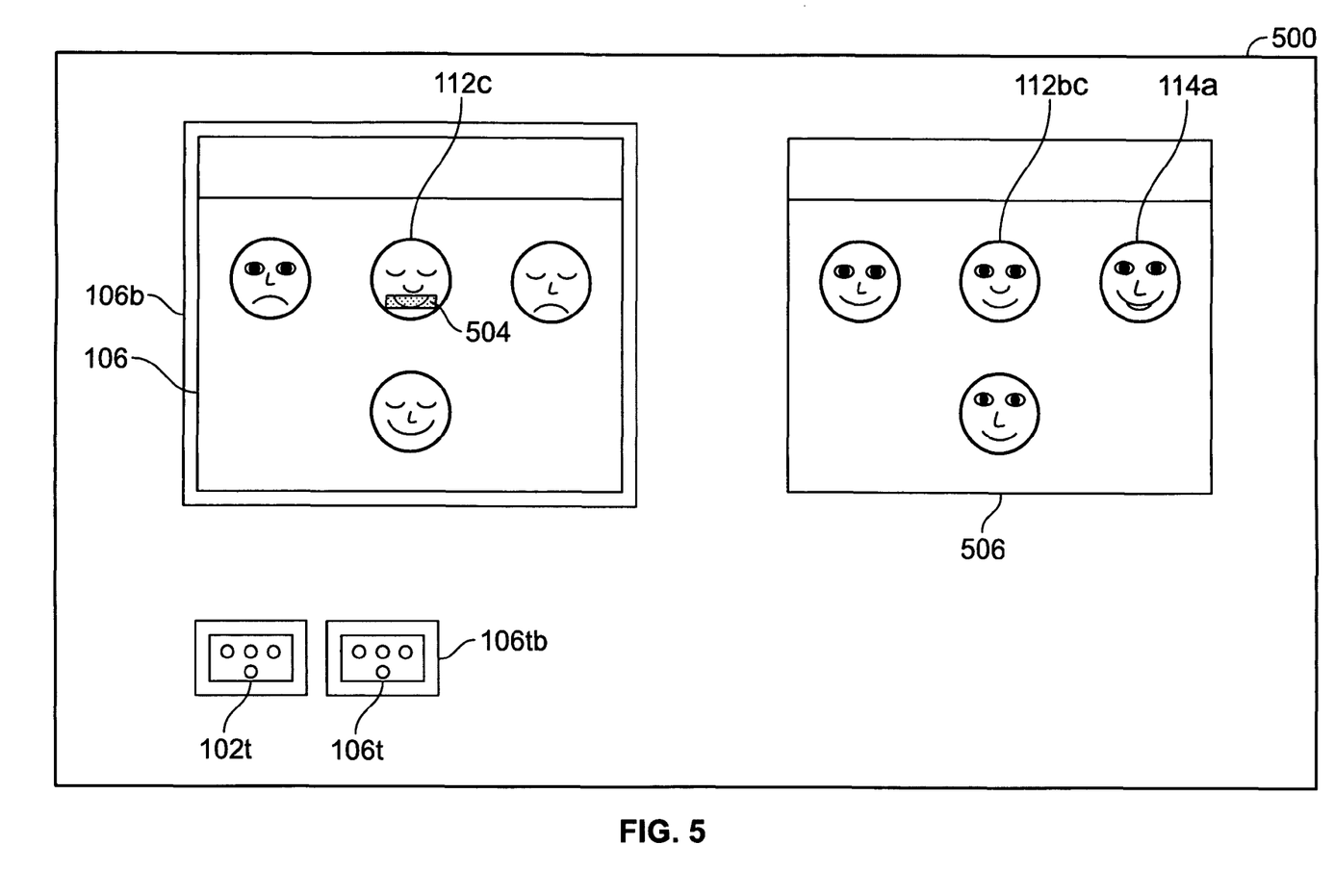
FIG. 5 is an example of a user interface for indicating a base image and a source image to use to generate a composite image when using a smaller stroke thickness.

FIG. 5 is an example of a user interface for indicating a base image and a source image to use to generate a composite image when using a smaller stroke thickness. In this example, a user has selected image 106 as a source image, as shown on the left hand side of UI 500 and used a narrow stroke to mark the smile of face 112c. Because the width of the stroke is narrower than in the example of FIG. 2, the boundary area is smaller and therefore the number of potentially modified pixels is fewer. As a result of the stroke, the smile of face 112b in base image 104 has been replaced with the smile of face 112c from source image 106, as shown in composite image 506 on the right hand side of UI 500, in which the center face 112bc has the open eyes of face 112b and the smile of face 112c. (Incidentally, the nose may be taken from either face 112b or 112c depending on the implementation. For example, cost function minimization may result in one or the other or a blend of the two noses being selected.) At this point, image 506 has been modified twice—first based on a stroke in source image 102 and then based on a stroke in source image 104. The user may now find that image 506 is acceptable.

In the above examples, source images were marked with strokes. An image may be marked with one or more strokes. In some embodiments, the base image can also be marked with a stroke, for example, to indicate (and add the constraint) that the pixels under that stroke should not be changed. For example, in some embodiments, in UI 500, the base image is made available as a thumbnail next to thumbnails 102t and 106t. Selecting the base image thumbnail causes the base image to appear on the left hand side and the user can then add a stroke to the base image. In some embodiments, the user may add a stroke directly to the base image on the right hand side.

Figure 6:
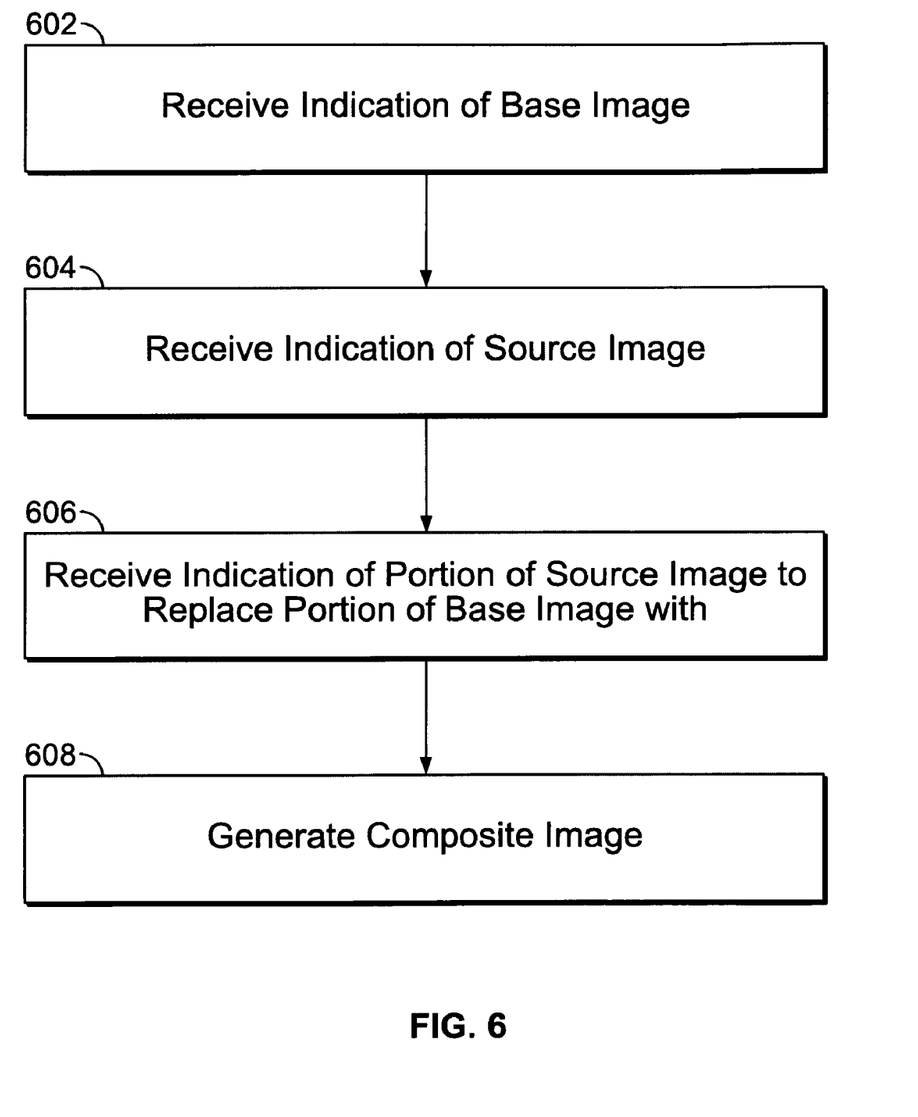
FIG. 6 is a flowchart illustrating an embodiment of a process for compositing an image.

FIG. 6 is a flowchart illustrating an embodiment of a process for compositing an image. For example, compositing or photomontage may be a feature of a photo editing application that performs this process. At 602, an indication of a base image is received. For example, in FIGS. 1-2, an indication that image 104 has been selected as a base image may be received. In various embodiments, a variety of interfaces may be provided to the user to indicate the base image. For example, the user may select an image and drag it to the right hand side of UI 200. Alternatively, a dialog box may provide an option for the user to specify a file corresponding to the base image.

At 604, an indication of a source image is received. For example, in UI 200, the indication of source image 102 is received when the user selects thumbnail 102t and adds stroke 204. At 606, an indication of a portion of the source image to replace a portion of the base image with is received. For example, in UI 200, the addition of stroke 204 indicates that one or more pixels in image 104 should be replaced by one or more pixels in image 102. Specifically, stroke area 208 is an area in image 104 corresponding to stroke 204 in image 102. A boundary area 206 is determined based on stroke area 208. One or more pixels in boundary area 206 is replaced with corresponding pixels from image 102. In some embodiments, pixels outside of boundary area 206 are not eligible to be replaced or modified. In other words, they remain the same (as the base pixels). At 608, a composite image is generated. Compositing an image is more fully described below.

Figure 7:
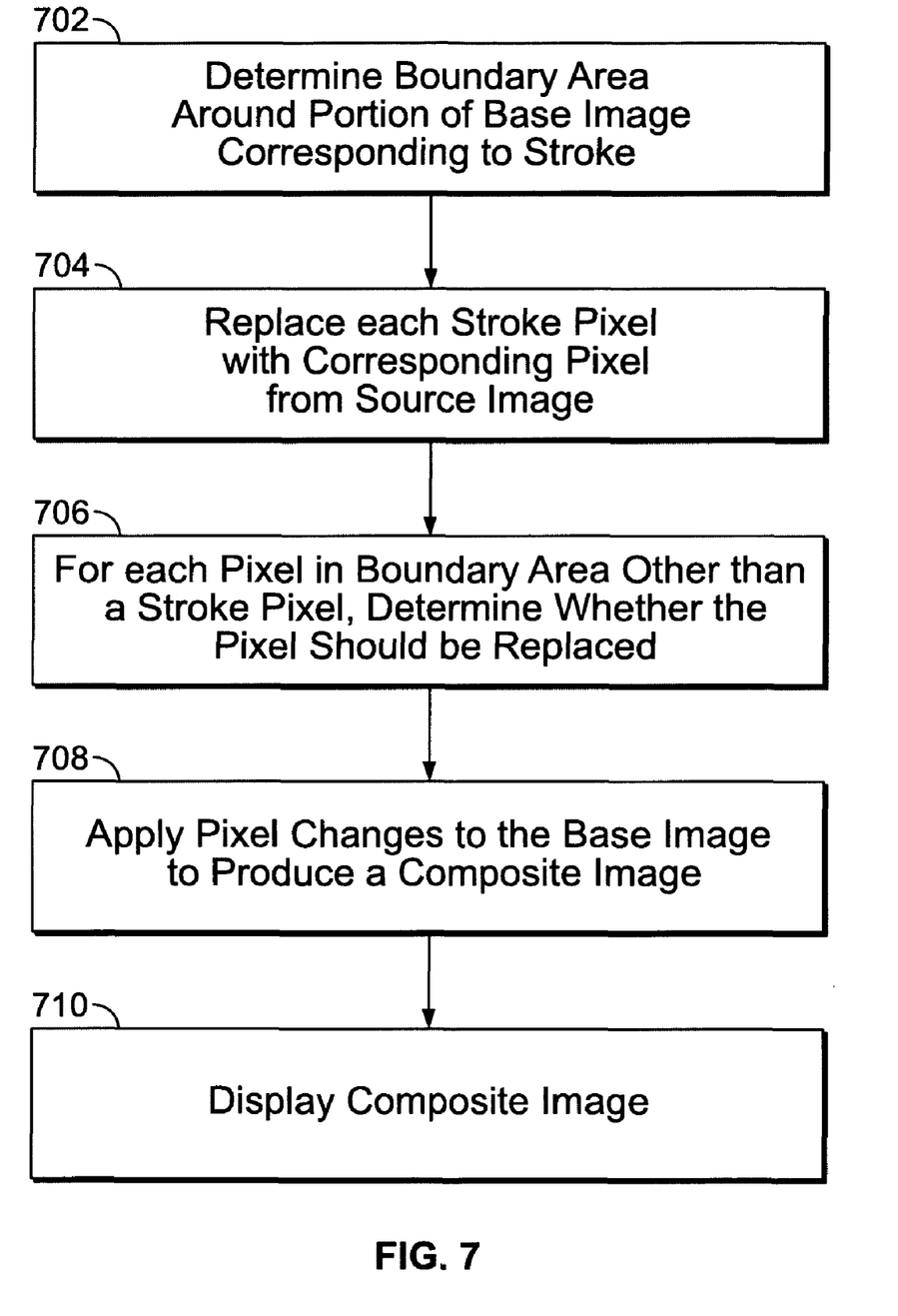
FIG. 7 is a flowchart illustrating an embodiment of a process for generating a composite image.

FIG. 7 is a flowchart illustrating an embodiment of a process for generating a composite image. For example, this process may be performed at 608. At 702, a boundary area around a portion of a base image corresponding to a stroke is determined. For example, in FIG. 2, boundary area 206 is determined based on stroke area 208, which is determined based on stroke 204. The pixels in stroke area 208 are stroke pixels. Stroke area 208 in image 104 corresponds to stroke 204 in image 102. In some cases, stroke area 208 includes the exact same (x, y) pixels in image 104 as the (x, y) pixels in image 102. In some cases, the (x, y) pixels of stroke area 208 in image 104 are translated or rotated relative to the (x, y) pixels of stroke 204 in image 102. This may be the case, for example, if the images are not aligned with each other.

At 704, each stroke pixel is replaced with a corresponding pixel from the source image. For example, each pixel in stroke area 208 is replaced with a corresponding pixel from the source image. In some cases, a corresponding pixel is the exact same (x, y) pixel in the source image. In some cases, a corresponding pixel is translated or rotated relative to the (x, y) pixel in the base image. This may be the case, for example, if the images are not aligned with each other.

At 706, for each pixel in the boundary area other than a stroke pixel, it is determined whether the pixel should be replaced. The pixel may be replaced with a pixel from the source image or taken from the base image (i.e., unchanged). For example, in FIG. 3, each pixel in boundary area 206, other than the pixels in stroke area 208 (or stroke pixels 208) can take on one of two values: (1) the corresponding pixel from source image 102 or (2) the base image pixel (i.e., unchanged). In some embodiments, the value is determined using cost function minimization given two constraints: (1) pixels in stroke area 208 are replaced with corresponding pixels from source image 102 and (2) pixels outside boundary area 206 are not modified. In the example of FIG. 3, the result is that modified area 210 is formed. Each pixel in modified area 210 is replaced with a corresponding pixel from image 102. Each pixel outside modified area 210 is taken from the base image (i.e., remains the same).

In some cases, a boundary area 206 may include not only stroke area 208, but a stroke area corresponding to a different stroke that was previously made with respect to a previously selected source image. In some embodiments, in this case, pixels within boundary area 206 may additionally take on a third value: that of the previously selected source image. In addition, the constraint that the pixels within the previous stroke must be taken from the corresponding pixels of the previously selected source image may be enforced in some embodiments.

In some cases, there is an overlap between two strokes. This may be resolved in a variety of ways. In some embodiments, the most recently added stroke wins. In other words, the pixels of the corresponding stroke areas that overlap in the base image take the value of the corresponding pixels of the stroke area of the source image corresponding to the most recently added stroke.

In some embodiments, as previously described, the pixels in boundary area 208 can be replaced with a pixel value that is neither from the source nor from the base image. For example, the pixel value may be a blend of pixels from the source and base image or determined in some other way.

At 708, pixel changes are applied to the base image to produce a composite image. For example, the modifications determined in FIG. 3 are to replace the pixels of modified area 210 with corresponding pixels from source image 102. The replacements are applied to base image 104 to produce composite image 400 in FIG. 4.

At 710, the composite image is displayed. For example, UI 200 is updated to display composite image 400 on the right hand side in place of base image 104.

In some embodiments, starting from a base image, after a first stroke is added to a first source image, a composite image is generated. Then if a second stroke is added to a second source image, the composite image is treated as the new base image. In other words, when generating the composite image from the new base image, pixels in the boundary area can potentially be selected from the first source image, the second source image, or the base image.

Returning to FIG. 5, the user may now view composite image 506 and decide that he does not like face 114a after all. For example, the user may decide that open mouths are not acceptable and that even having closed eyes (as in face 114b in base image 104) is better. Because stroke 204 was added prior to stroke 504, if the user applies an "Undo" to remove stroke 204, he will cause stroke 504 to be removed in the process. This may be undesirable because the user likes the effect of stroke 504 and does not want to get rid of it. In such cases, the user may decide to use an eraser tool, which allows the user to erase stroke 204 and not other strokes if so desired.

Figure 8A:
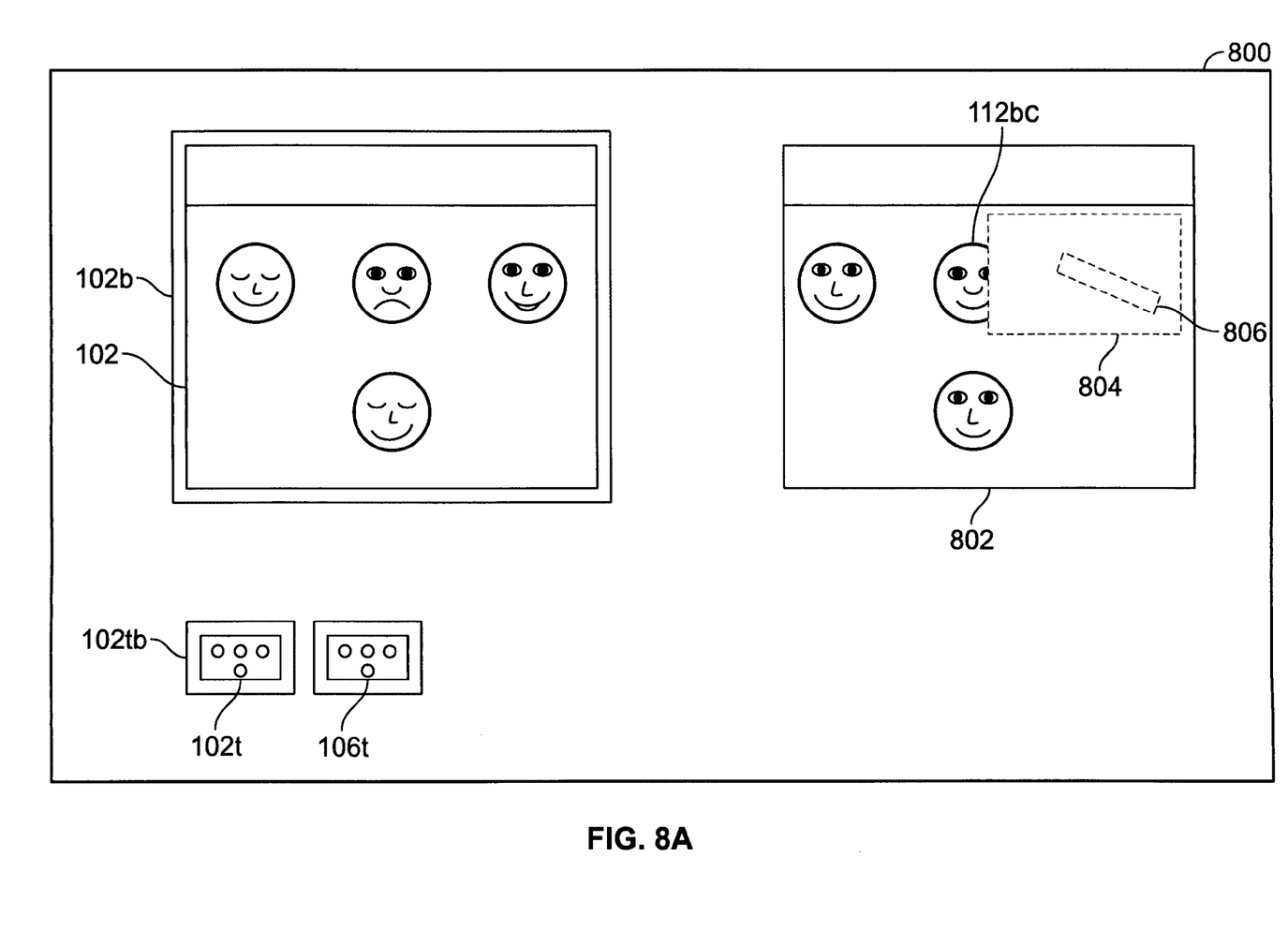
FIG. 8A is an example of a user interface in which a stroke has been erased.

FIG. 8A is an example of a user interface in which a stroke has been erased. In this example, UI 800 is what UI 500 looks like after stroke 204 has been erased. In other words, to get here from UI 500, the user has selected thumbnail 102t, causing image 102 to be displayed on the left hand side with stroke 204 displayed (as shown on the left hand side of UI 200) and the user has erased stroke 204. As a result, a boundary area 804 is determined based on now-erased stroke 204. Erased stroke area 806 in base image 802 corresponding to (the erased pixels in) erased stroke 204 is determined. Erased stroke area 806 is used to determine boundary area 804. In some embodiments, boundary area 804 is determined in a similar way to when a stroke is added, treating the erased stroke (or portion of a stroke) as the added stroke. In this case, because the entire stroke was erased, boundary area 804 has the same size and location as boundary area 206. In some embodiments, a boundary area corresponding to an erased stroke is different in size and/or location than a boundary area corresponding to an added stroke. For example, a boundary area corresponding to an erased stroke may be scaled up by a smaller factor. In some embodiments, if a stroke is not fully erased, the boundary area is based only on the portion of the stroke that was erased.

Figure 9:
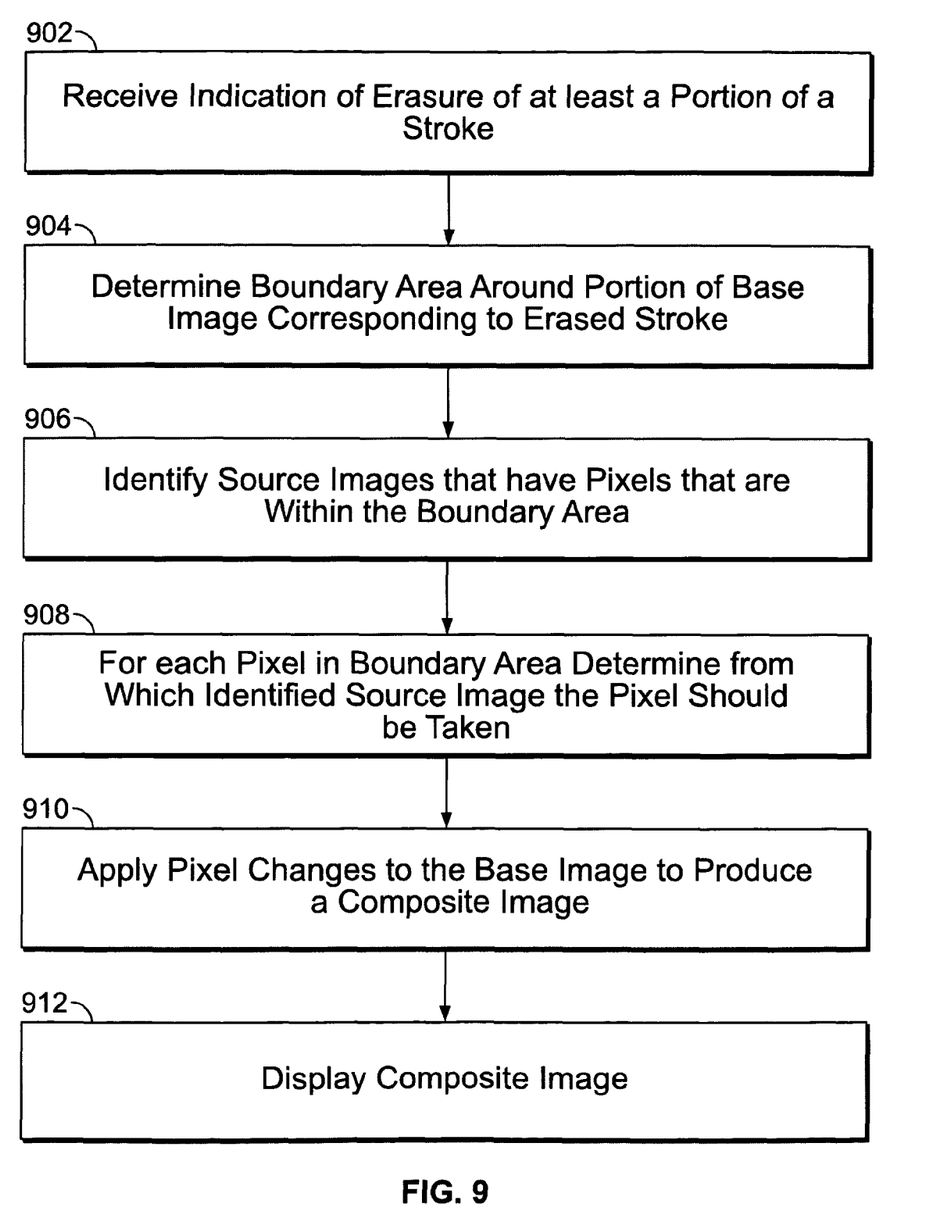
FIG. 9 is a flowchart illustrating an embodiment of a process for handling an erasure.

FIG. 9 is a flowchart illustrating an embodiment of a process for handling an erasure. At 902, an indication of an erasure of at least a portion of a stroke is received. For example, in FIG. 8, an indication is received when the user erases stroke 204. At 904, a boundary area around a portion of the base image corresponding to the erased stroke is determined. For example, boundary area 804 is determined, as previously described.

At 906, source images that have pixels that are within the boundary area are identified. The source images can include the base image, since pixels within a boundary area can be from the base image. For example, within boundary area 804, it is determined from which source images the pixels are taken from. For example, in FIG. 8A, boundary area 804 includes pixels from: source image 102 (since modified area 210, which is within boundary area 804, includes pixels from source image 102), source image 106 (since face 112bc includes pixels from source image 106), and base image 104. Thus, images 102 and 106 and base image 104 are identified in this case. In some cases, if only a portion of a stroke was erased, if the remaining portion of the stroke is in the boundary area, then the source image corresponding to the stroke is identified. The identified images contain candidate source pixels that may be used to replace pixels in boundary area 804.f At 908, for each pixel in the boundary area, it is determined from which identified source image the pixel should be taken from. For example, each pixel in boundary area 804 may be taken from image 102, 104, or 106. A cost function minimization may be performed given these possible pixel values with the constraint that changes are limited to within boundary area 804. In other embodiments, other possible pixel values for the pixels in boundary area 804 include a blend of the pixels from images 102, 104, and/or 106, or some other value.

In some embodiments, an additional constraint is added: The pixels that are under the erased portions of an erased stroke in the composite image cannot come from the source image that they came from before the erasure. In some embodiments, this means that the pixels under the erased portions are all replaced. For example, in FIG. 8A, pixels in erased stroke area 806 would be constrained not to come from source image 102. In this case, since pixels in erased stroke area 806 are all from source image 102, then the pixels under in erased stroke area 806 are replaced. This would make sure that the user would see a change in the pixels under the erased stroke, which is the expected behavior.

Figure 8B:
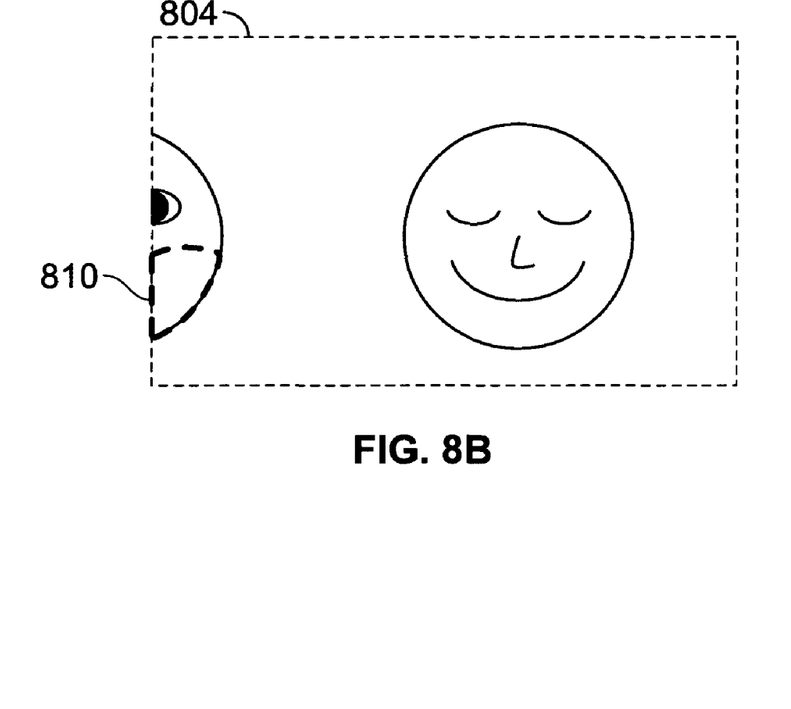
FIG. 8B is an example of a boundary area resulting from an erasure.

FIG. 8B is an example of a boundary area resulting from an erasure. Boundary area 804 is shown. As a result of performing a cost function minimization, portion 810 of boundary area 804 is copied or taken from (corresponding pixels in) source image 106 and the remaining portion of boundary area 804 is copied or taken from (corresponding pixels in) base image 104. In this example, cost function minimization resulted in no pixels from image 102 being used to replace pixels in boundary area 804.

Figure 8C:
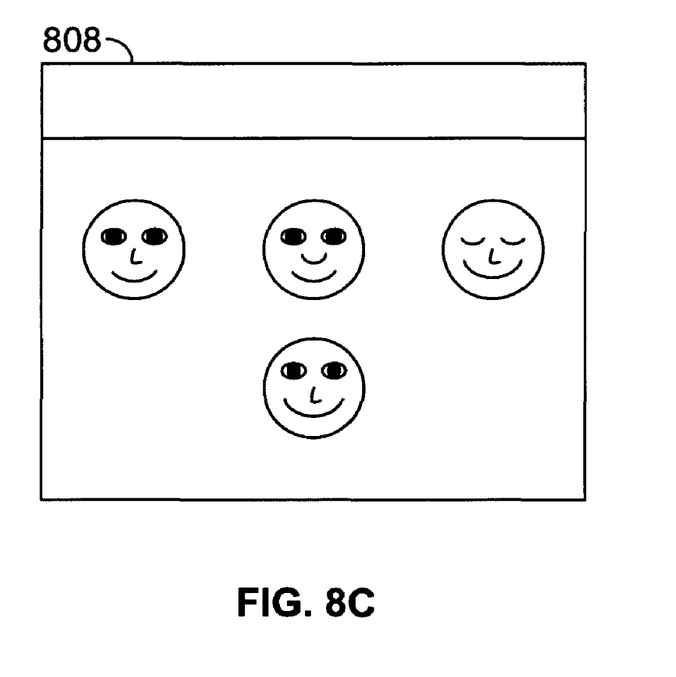
FIG. 8C is an example of a composite image after an erasure.

Returning to FIG. 9, at 910, the pixel changes are applied to the base image to produce a composite image. For example, the face in the upper right of image 802 may now look like he originally did (i.e., like face 114b) if that portion of image 802 is taken from base image 104. FIG. 8C is an example of a composite image after an erasure. In this example, image 808 shows image 802 after the erasure of stroke 204. At 912, the composite image is displayed. For example, image 808 is displayed in UI 800, replacing image 802.

As described herein, as a stroke is applied or erased, the base (or composite) image is dynamically updated in response to the stroke being applied. In other words, applying a stroke triggers or initiates an update of the base (or composite image). In other embodiments, multiple strokes may be applied and/or erased before an update is made.

Although the examples described are with respect to group shots, the compositing (photomontage) techniques described herein can be applied to a variety of images to achieve a variety of effects.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
   receiving an indication of a base image;
   receiving an indication of an acceptable portion of a source image;
   automatically computing a boundary area in the base image based at least in part on the acceptable portion of the source image, which is based at least in part on a user stroke having a user stroke area;
   generating a composite image at least in part by replacing one or more pixels in the base image, including computing a cost function using values of pixels in the source image and values of pixels in the base image and minimizing the cost function by combining the following two input constraints: (1) pixels in the user stroke area are replaced based at least in part on corresponding pixels from the source image; and (2) pixels outside the boundary area are not modified, wherein cost function minimization results in a modified area within the boundary area and an unmodified area within the boundary area, the modified area comprising at least the user stroke area; and
   displaying the composite image;
   wherein the boundary area includes the user stroke area as well as a second user stroke area corresponding to a second stroke that was previously made with respect to a second source image.

2. A method as recited in claim 1, wherein the boundary area is rectangular.

3. A method as recited in claim 1, wherein determining a boundary area includes determining a minimum sized rectangle that fits around a stroke on the source image.

4. A method as recited in claim 1 wherein determining a boundary area includes determining an initial area surrounding and completely including the user stroke area and then scaling the initial area by a factor.

5. A method as recited in claim 1, wherein generating the composite image includes determining which pixels should be replaced such that a transition from source pixels to base pixels is less noticeable visually.

6. A method as recited in claim 1, further including receiving an indication that at least a portion of the user stroke has been erased.

7. A method as recited in claim 1, further including determining a second boundary area in the base image associated with a portion of the user stroke that has been erased.

8. A method as recited in claim 7, further including replacing one or more pixels, wherein replacements are constrained to within the second boundary area.

9. A method as recited in claim 7, further including identifying one or more source images that have pixels that are within the second boundary area.

10. A method as recited in claim 9, further including replacing one or more pixels with one or more pixels from the one or more identified source images, wherein replacements are constrained to within the second boundary area.

11. A method as recited in claim 9, wherein the one or more identified source images include the base image.

12. A method as recited in claim 1, wherein in the case of an overlapping area between the user stroke area and a second user stroke, the pixels of the overlapping area in the base image take the values of the pixels of the stroke area corresponding to the most recently added stroke.

13. A system, including:
   a processor; and
   a memory coupled with the processor, wherein the memory is configured to provide the processor with instructions which when executed cause the processor to:
   receive an indication of a base image;
   receive an indication of an acceptable portion of a source image;
   automatically compute a boundary area in the base image based at least in part on the acceptable portion of the source image, which is based at least in part on a user stroke having a user stroke area;
   generate a composite image at least in part by replacing one or more pixels in the base image, including computing a cost function using values of pixels in the source image and values of pixels in the base image and minimizing the cost function by combining the following two input constraints: (1) pixels in the user stroke area are replaced based at least in part on corresponding pixels from the source image; and (2) pixels outside the boundary area are not modified, wherein cost function minimization results in a modified area within the boundary area and an unmodified area within the boundary area, the modified area comprising at least the user stroke area; and
   display the composite image;
   wherein the boundary area includes the user stroke area as well as a second user stroke area corresponding to a second stroke that was previously made with respect to a second source image.

14. A system as recited in claim 13, wherein the memory is further configured to provide the processor with instructions which when executed cause the processor to determine a second boundary area in the base image associated with a portion of the user stroke that has been erased.

15. A system as recited in claim 13, wherein determining a boundary area includes determining an initial area surrounding and completely including the user stroke area.

16. A computer program product being embodied in a non-transitory computer readable medium and comprising computer instructions for:
receiving an indication of a base image;
receiving an indication of an acceptable portion of a source image;
automatically computing a boundary area in the base image based at least in part on the acceptable portion of the source image, which is based at least in part on a user stroke having a user stroke area;
generating a composite image at least in part by replacing one or more pixels in the base image, including computing a cost function using values of pixels in the source image and values of pixels in the base image and minimizing the cost function by combining the following two input constraints: (1) pixels in the user stroke area are replaced based at least in part on corresponding pixels from the source image; and (2) pixels outside the boundary area are not modified, wherein cost function minimization results in a modified area within the boundary area and an unmodified area within the boundary area, the modified area comprising at least the user stroke area; and
displaying the composite image;
wherein the boundary area includes the user stroke area as well as a second user stroke area corresponding to a second stroke that was previously made with respect to a second source image.

17. A computer program product as recited in claim 16, the computer program product further comprising computer instructions for determining a second boundary area in the base image associated with a portion of the user stroke that has been erased.

18. A method, including:
receiving an indication of a base image;
receiving an indication of an acceptable portion of a source image;
automatically computing a boundary area in the base image based at least in part on the acceptable portion of the source image, which is based at least in part on a user stroke having a user stroke area;
receiving an indication of a portion of the base image that should not be changed based on a second user stroke;
generating a composite image at least in part by replacing one or more pixels in the base image, including computing a cost function using values of pixels in the source image and values of pixels in the base image and minimizing the cost function by combining the following two input constraints: (1) pixels in the user stroke area are replaced based at least in part on corresponding pixels from the source image; and (2) pixels outside the boundary area are not modified, wherein cost function minimization results in a modified area within the boundary area and an unmodified area within the boundary area, the modified area comprising at least the user stroke area; and
displaying the composite image.

19. A method as recited in claim 18, further including determining a second boundary area in the base image associated with a portion of the user stroke that has been erased.

20. A system as recited in claim 19, wherein the memory is further configured to provide the processor with instructions which when executed cause the processor to determine a second boundary area in the base image associated with a portion of the user stroke that has been erased.

21. A system, including:
a processor; and
a memory coupled with the processor, wherein the memory is configured to provide the processor with instructions which when executed cause the processor to:
receive an indication of a base image;
receive an indication of an acceptable portion of a source image;
automatically compute a boundary area in the base image based at least in part on the acceptable portion of the source image, which is based at least in part on a user stroke having a user stroke area;
receive an indication of a portion of the base image that should not be changed based on a second user stroke;
generate a composite image at least in part by replacing one or more pixels in the base image, including computing a cost function using values of pixels in the source image and values of pixels in the base image and minimizing the cost function by combining the following two input constraints: (1) pixels in the user stroke area are replaced based at least in part on corresponding pixels from the source image; and (2) pixels outside the boundary area are not modified, wherein cost function minimization results in a modified area within the boundary area and an unmodified area within the boundary area, the modified area comprising at least the user stroke area; and
display the composite image.

22. A system as recited in claim 21, wherein determining a boundary area includes determining an initial area surrounding and completely including the user stroke area.

* * * * *